(12) United States Patent
Ghizzoni

(10) Patent No.: US 6,698,016 B1
(45) Date of Patent: Feb. 24, 2004

(54) METHOD FOR INJECTING CODE INTO ANOTHER PROCESS

(75) Inventor: Alberto Ghizzoni, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 426 days.

(21) Appl. No.: 09/649,798

(22) Filed: Aug. 29, 2000

(51) Int. Cl.[7] .................................................. G06F 9/44
(52) U.S. Cl. ...................................... 717/162; 717/131
(58) Field of Search ............................... 717/130–133, 717/162–167

(56) References Cited

U.S. PATENT DOCUMENTS

| | | | | | |
|---|---|---|---|---|---|
| 5,313,616 | A | * | 5/1994 | Cline et al. ................. | 717/127 |
| 5,634,022 | A | * | 5/1997 | Crouse et al. .............. | 717/130 |
| 6,009,525 | A | * | 12/1999 | Horstmann ................. | 713/200 |
| 6,065,679 | A | * | 5/2000 | Levie et al. ........... | 235/462.47 |
| 6,167,479 | A | * | 12/2000 | Hartnett et al. ............. | 710/260 |

OTHER PUBLICATIONS

Morell et al. Pertubation Analysis of Computer Programs. IEEE. 1997. pp. 77–87.*
Ghosh et al. An Automated Approach for Identifying Potential Vulnerabilities in Software. 1998. pp. 104–114.*
Matt Pietrek, "Peering Inside the PE: A Tour of the Win32 Portable Executable File Format", Microsoft Systems Journal, vol. 9, No. 3, p. 1534, Mar. 1994.
Jeffrey Richter, "Programmable Applications for Microsoft Windows, Fourth Edition", Microsoft Press, p. 794, Sep. 29, 1999.

* cited by examiner

Primary Examiner—Wei Zhen
(74) Attorney, Agent, or Firm—Leydig, Voit & Mayer, Ltd.

(57) ABSTRACT

A method to map an external module into a target process in an operating system that keeps executable code in a memory location that can be determined. The starting memory address of the target process is retrieved and the target process is loaded as suspended. The target process' starting instructions are saved and instructions that load the external module are inserted at the starting memory address. The target process resumes execution resulting in the external module getting loaded. The target process' starting instructions are restored and the target process resumes execution, but with the external module mapped into the target process' memory.

20 Claims, 4 Drawing Sheets

METHOD FOR INJECTING CODE INTO ANOTHER PROCESS

TECHNICAL FIELD

This invention relates generally to computer software diagnostic tools and, more particularly, relates to injecting code into another process.

BACKGROUND OF THE INVENTION

Many software programs and computer-oriented tools and techniques monitor and analyze executable programs and modules. In many instances, these software programs, tools, and techniques may need to control another program (i.e., "target process"), change a target process' behavior with the target process being unaware of the change in control or behavior, or determine how the target process will interact with other programs and the operating system in which the target process will be run.

For example, anti-virus software needs to map into the target process and determine what the target process will do when it is activated. Debuggers are used to detect, locate, and correct logical or syntactical errors in the target process. They allow a programmer to step through a target process, examine the data, and monitor conditions (such as variables) in the target process. Profilers analyze a target process and determine the time that the process spends in various parts the process during execution. This is often used to determine which API (Application Programming Interface) calls are taking up time. Security check tools verify that a user is authorized to execute a particular process or that a target process is allowed to run a particular task. API interception techniques intercept program calls sent to a target process or sent from a target process. This requires mapping into the target process at the beginning of the process' execution and is done for a variety of reasons including testing the target process, profiling, monitoring selected events, and re-directing the API call to another process. Pseudo-localization attempts to anticipate what a target process will do when that process and the process' resources are changed into a different language for operation in different regions of the world.

One way of implementing these software programs, tools, and techniques (e.g., anti-virus, debugging, profiling, API interception, security checks, pseudo-localization, etc.) is by mapping, or injecting, a module into the target process in order to execute certain tasks. The term "module" includes any routine, program, object, component, data structure, etc. that performs particular tasks or implements particular abstract data types. Several methods have been developed to inject a module into another process to assist in the development of the software programs, tools, and techniques. These methods are injecting the module using the operating system's registry, injecting the module using hooks, injecting the module using remote threads, injecting the module as a debugger, and injecting the module with a Trojan process.

The method of injecting a module via an operating system's registry is limited only to those operating systems that use a system registry. A system registry contains the configuration for the operating system. This method works by modifying one of the key entries in the register and placing the name of the module and its path in the key entry. When the operating system is restarted, the system saves the value of the key during the initialization process and loads each module in the key when one of the system libraries is mapped into a process. For example, in Microsoft® Windows NT®, when the User32.dll library is mapped into a process, User32.dll retrieves the saved value of the AppInit_DLLs key and loads each module specified in the string. There are several limitations to this method. The operating system must be restarted for this method to work and it does not work in every operating system that uses a registry. For example, it will not work in Microsoft® Windows® 98. Additionally, it only works with those processes that use User32.dll, which are all GUI (Graphical User Interface) based applications. The method will not work on console user interface (CUI) based applications (i.e., text-based). Another limitation is that the injected module will be mapped into every GUI-based application, which is not necessary and increases the likelihood of an operating system crash.

Another method of injecting a module into a target process uses hooks. A hook is a point in an operating system's message-handling mechanism where an application can monitor messages in the operating system for specified events and process certain types of messages before the messages reach the target process. For example, in Microsoft Windows operating systems, one type of hook monitors messages posted to a queue and calls a predefined code before the message is processed. When the target process prepares to send a message, the operating system checks to see if the module containing the predefined code that the hook calls is mapped into the target process' address space (i.e., memory area). If the module is not mapped, the operating system forces the module to be mapped into the target process' address space. The drawback to this method is that it has effect only after the target process has been started. This is a significant limitation for tools like profilers that need to be mapped into the target process virtual address area as soon as the target process starts.

A third method of injecting a module into a target process uses remote threads. This is specific to operating systems that use threads and that allow remote threads to be created. A thread is created in the context of a process and it executes code within its process' address space and manipulates data within its process' address space. Two or more threads running in the same process share the process' address space, can execute the same code and manipulate the same data. A remote thread is created and controlled by a process to run in the address space of a target process. The drawback to this approach is that is does not work in every operating system that uses threads. For example, Microsoft® Windows® 2000 supports remote thread creation while Microsoft® Windows® 95 and Microsoft® Windows® 98 do not support remote thread creation. Additionally, the target process must be running when the remote thread is created.

Injecting a module into a target process can also be done by injecting the module as a debugger. It is well known that when a debuggee process loads, the operating system automatically notifies the debugger when the debuggee process' address space is ready. This notification occurs prior to the debuggee process executing any code. When the notification arrives, the debugger can force code into the debuggee's address space and then cause the debuggee process to execute that code. The major drawback to this approach is that the target process runs in the debug mode instead of running as it normally would. This affects the target process' behavior and significantly affects the target process' performance. Additionally, many operating systems terminate the debugger if the debuggee process is terminated.

Another method to inject a module into a target process is to inject the module as a Trojan process. This requires knowing what modules the target process will load. One of the modules the target process will load is overwritten or replaced with the injected module. When the target process loads the module, the injected module will be loaded by the target process in place of the original module. This method has the drawback of requiring the target process to be running, which limits is usefulness for tools like profilers that need to be mapped into the target process' address space as soon as the target process starts.

What is needed is a method to inject a module into a target process that is injected as soon as the target process starts, that works on both console and GUI applications, and that does not require the target process to be run as a debuggee, and that preferably works on different implementations of the Win32® architecture.

SUMMARY OF THE INVENTION

In view of the above-described problems existing in the art, the present invention provides a mechanism for mapping a module into a target process in an operating system. The invention allows the module to be injected into the target process as soon as the target process starts. The module is injected before any target process instructions are executed. The mechanism works on both console and GUI applications and it does not require the target process to be run as a debugee.

In order to provide this mechanism, the system architecture must provide the capability to find the location in memory (i.e., starting address) where the target process will begin execution. The starting address of the target process is retrieved. The target process is then loaded as suspended so that no target process instructions are executed. The target process starting instructions are saved, and thereafter instructions are forced into the starting address. These instructions, when executed, load a helper module that loads the module to be injected. The target process is then started, resulting in the execution of the inserted instructions. Once these instructions have been executed, the original starting instructions are restored back into the starting address. The process resumes execution from the starting address as if nothing had happened.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
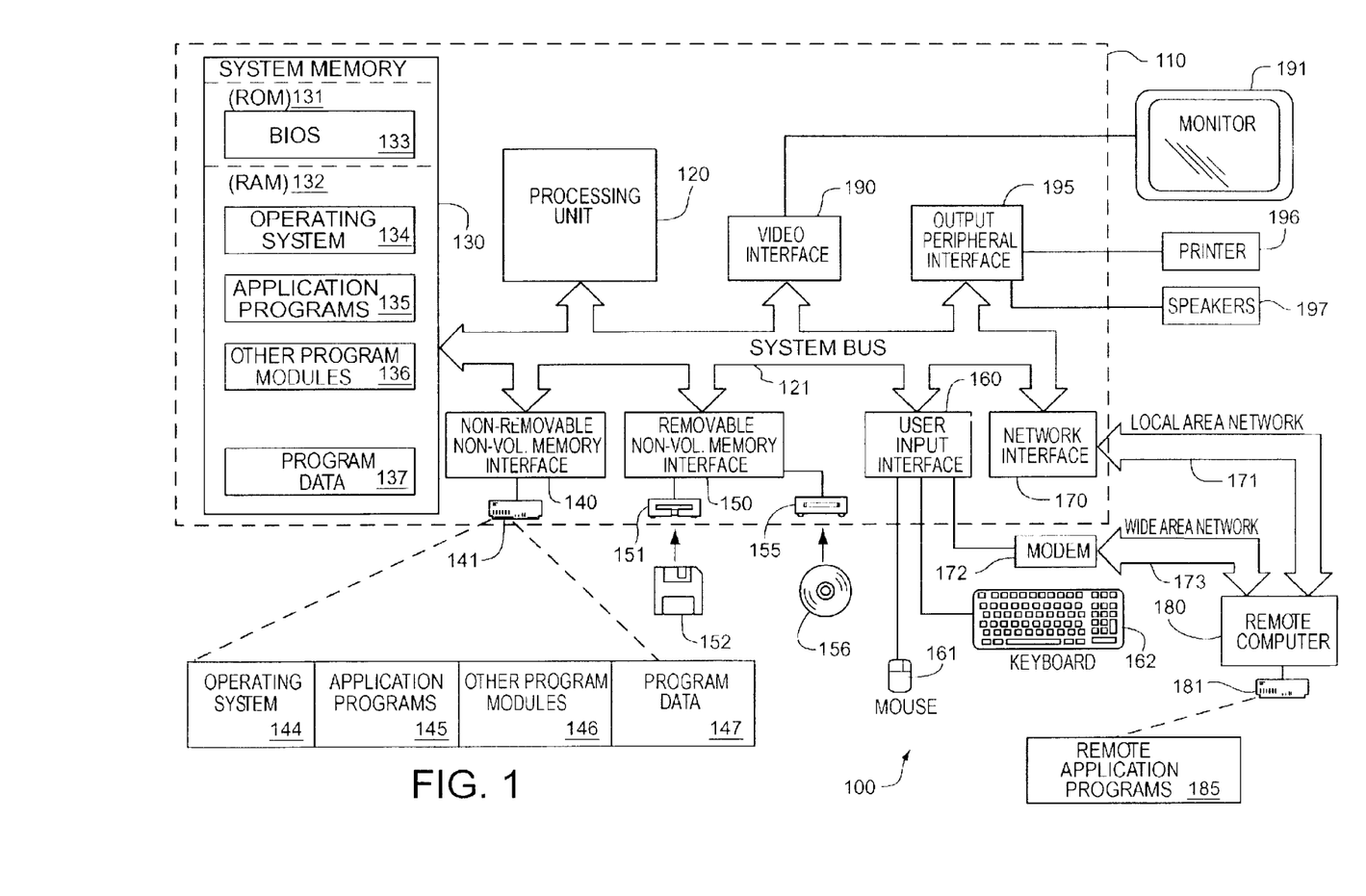
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
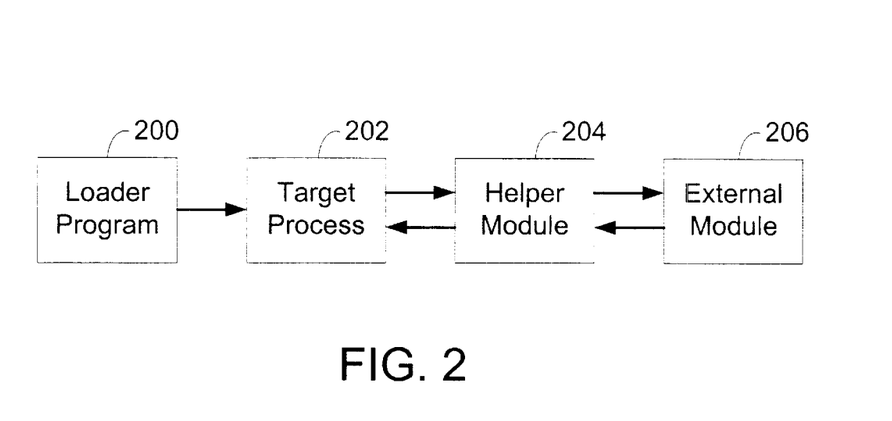
FIG. 2 shows the components involved in implementing an embodiment of the mechanism of the instant invention.

FIG. 2 shows the relevant components involved in implementing an embodiment of the invention. A loader program 200 loads the target process 202 and forces the target process 202 to load the helper module 204. Once helper module 204 is loaded, it loads the external module 206. Once the external module 206 is loaded, it is mapped into the target process 202 and the external module 206 returns control to the helper module 204. The helper module 204 resumes normal execution of the target process 202 at the start of the target process 202.

Figure 3:
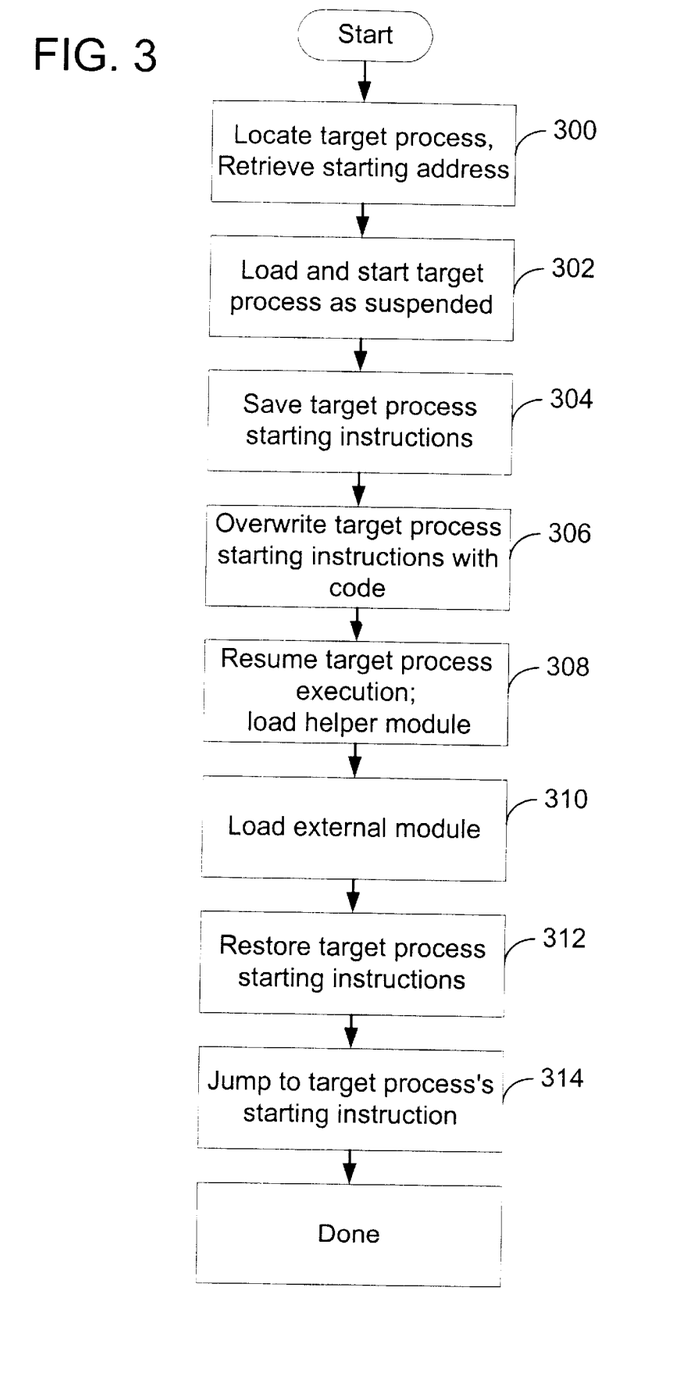
FIG. 3 is a flow chart illustrating how a module can be injected into a target process in accordance with the teachings of the invention.

FIG. 3 shows a flow diagram of the steps taken to map an external module into another process. The loader program 200 locates the target process 202 and retrieves its starting address (Step 300). Once the starting address has been retrieved, the loader program loads and starts the target process 202 as suspended (Step 302). Loading the target process as suspended loads the target process into memory, but does not execute any instructions until it is commanded to run. The loader program 200 then saves the target processes starting instructions (Step 304). The loader program then overwrites the target processes starting instructions with code that loads the helper module 204 (Step 306). The loader program 200 resumes the target process execution, resulting in the helper module 204 being loaded (Step 308).

The helper module 204 loads the external module 206 (Step 310). The external module gets loaded and, as a result, is now permanently injected into the target process 202 for as long as the target process 202 is loaded. The helper module 204 restores the target process' starting instructions (Step 312). The helper module 204 then jumps directly to the target process' original starting instructions (Step 314) and resumes the target process' execution. The target process 202 is left alone running unaware that an external module has been mapped into the target process.

In one embodiment, the code that is inserted into the target process 202 is written in machine language code because many software programs and computer-oriented tools and techniques require fast execution times. Machine language code requires minimum overhead, which results in fast execution times. This requires that the code be rewritten for each processor platform in which the operating system is installed. Other programming languages could be used that can be run on any processor platform, but at the expense of performance.

Figure 4:
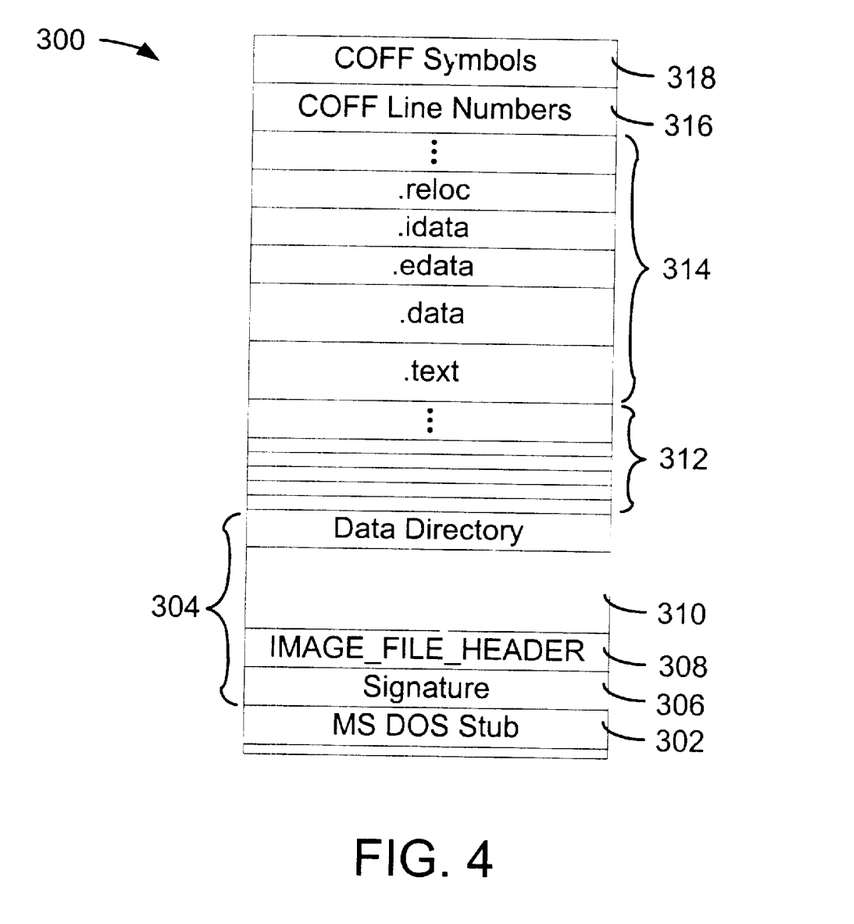
FIG. 4 is a block diagram generally illustrating a portable executable file format suitable for use in the instant invention.

Steps 300 to 314 will now be described in the context of a Windows® brand operating system sold by Microsoft Corporation, such as Windows® 98, Windows NT®, Windows® CE, Windows® 2000, WinME, or other derivative versions of Windows®. One skilled in the art will recognize that the instant invention is also applicable to any operating system that keeps code in a memory location that can be determined. All Win32®-based systems use a portable executable file format. The starting address of the target process can be found by looking it up in the executable header of the portable executable file. FIG. 4 illustrates a portable executable file 400 used in the Windows® operating system and which is suitable for use with the instant invention. The portable executable file has a collection of fields that define what the rest of the file looks like. These fields contain information such as the locations and sizes of executable code and data areas and other operating system information. The first part of a typical portable executable file is the MS-DOS stub 402. The primary header 404 can be found by looking up its starting offset stored in the MS-DOS stub header 402. The primary header 404 consists of a Signature Field 406, a File Header 408, and an Optional Header 410. A section table 412 lies above the primary header 404. A section table 412 contains information about each section in the portable executable file. Sections 414, the COFF (Common Object File Format) line numbers 416, and the COFF symbols 418 lie above the section table 412. Sections 414 contain blocks of data. For example, the dot text section contains all general-purpose executable code. COFF line numbers 416 indicates the relationship between executable code and line numbers in source files. COFF symbols 418 is an array of records that define a symbol or a name.

The starting address can be found in the Optional Header 410. The Optional Header 410 is required for all image files (e.g., target processes). The Optional Header 410 contains fields that provide information about the executable file. The Optional Header 410 has several standard fields. One of the standard fields (i.e., the $7^{th}$) is AddressOfEntryPoint. The entry in this field is the starting address of the executable file.

In the Windows® operating system, processes are loaded with the CreateProcess command. The CreateProcess command creates a new process which runs the specified executable file. One of the flags that can be set in this command is CREATE_SUSPENDED. When this flag is set, the process is created in a suspended state. This means that the process is loaded into memory, but does not run until the ResumeThread command is called.

The target process starting instructions that will be overwritten by the replacement code is saved by calling the ReadProcessMemory command. The number of bytes of starting instructions saved is equal to the size of the replacement code that is written into the target process.

Overwriting a target process starting instructions with replacement code is done by preparing a structure in memory which contains the code and its associated parameters. This structure is then copied into the target process memory at the starting address by running the WriteProcessMemory command. The target process is then allowed to resume execution with a call to ResumeThread.

The replacement code performs a LoadLibrary. This code loads helper module 204. The reason the helper module 204 is needed is that the replacement code must be replaced with the original starting instructions once the external module 206 has been loaded. Code cannot overwrite itself, so replacing the replacement code with the original starting instructions has to be done by different code, which is located in the helper module 204. The helper module 204 loads the external module 206 and restores the original instructions of the target process 202 back at its' starting address.

Control is then returned to the target process 202 at its starting address. It can then proceed with its execution as if nothing had happened. However, the external module 206 is now permanently mapped into its address space.

In the Windows® operating system, each process is assigned its own memory area. In the instant invention, two different memory areas are present. One memory is for the loader program 200 and the other memory area is for the target process 202. In order for these memory areas to communicate with each other, a shared memory object is created. A shared memory object can be seen by more than one process. The target process starting instructions are saved in the shared memory object, so that it can be seen by both of the processes. The loader program 200 creates the shared memory object and keeps it in memory until it is no longer needed. When the helper module 204 has restored the target process starting instructions, it signals the loader program 200. When the loader program 200 receives this signal, it releases the shared memory object and terminates itself.

A method to map an external module into a target process has been described. Replacement code is written into the starting address of the target process before the target process has executed any instructions in order to load an external module. The method works on different implementations of the Win32® architecture. The method can be used by any application that performs a function that requires knowledge of a target process' behavior, control of a target process, or change of a target process' behavior. Some of these applications are anti-virus programs, profilers, debuggers, and pseudo-localization testing.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A computer-readable medium having computer-executable instructions for performing steps comprising:
   determining a starting address of a target process;
   loading the target process;
   starting the target process as suspended;
   placing loading instructions for loading a module into the starting address; and
   resuming the target process, the target process thereby executing the loading instructions resulting in an injected module being loaded into the target process.

2. The computer-readable medium of claim 1 wherein the target process executes the loading instructions when the target process resumes, the computer-readable medium having further computer-executable instructions for performing the steps of:
   saving target process starting instructions from the starting address prior to the step of placing the loading instructions into the starting address; and
   restoring the target process starting instructions into the starting address after the target process has executed the loading instructions.

3. The computer-readable medium of claim 2 having further computer-executable instructions for performing the step of executing the target process from the starting address.

4. The computer-readable medium of claim 2 wherein the step of saving target process starting instructions comprises the step of reading and saving a selected size of target process starting instructions, the selected size equal to a size of the loading instructions.

5. The computer-readable medium of claim 2 wherein a process resides in a first memory area and the target process resides in a second memory area, the step of saving target process starting instructions comprises saving the target process starting instructions in a shared memory object, the shared memory object accessible to the first memory area and the second memory area.

6. The computer-readable medium of claim 1 wherein the step of determining the starting address comprises the step of looking up the starting address in an executable header of the target process.

7. A method for mapping an external module into a target process comprising:
   retrieving a starting address of the target process;
   starting the target process as suspended;
   inserting code at the starting address, the code having instructions for loading a helper module;
   resuming execution of the target process, the target process thereby executing the code resulting in the helper module being loaded; and
   loading the external module, the external module being mapped into the target process.

8. The method of claim 7 wherein the step of inserting code at the starting address comprises the steps of:
   preparing a structure in memory containing the code; and
   copying the structure into the target process at the starting address.

9. The method of claim 8 wherein the step of copying the structure into the target process at the starting address comprises the step of copying the structure into a second memory area, the second memory area containing the target process.

10. The method of claim 7 further comprising the steps of:
    saving target process starting code;
    restoring the target process starting code to the starting address after the external module has been loaded; and
    resuming execution of the target process at the starting address.

11. The method of claim 10 wherein the step of saving the target process starting code further comprises the step of reading a pre-determined number of bytes of the target process starting code, the pre-determined number of bytes set to a number of bytes in the code being injected.

12. The method of claim 10 wherein the step of saving the target process code comprises the step of saving the target process code into a shared memory object, the shared memory object being accessible by the first program and the helper module.

13. The method of claim 12 further comprising the step of releasing the shared memory object in response to receiving a notification that the target process has been restored.

14. The method of claim 10 wherein the step of resuming execution of the target process at the starting address further comprises the step of jumping, by the helper module, directly to a location of the target process starting code.

15. The method of claim 7 wherein a target process file format is an executable file, the step of retrieving the starting address comprises the step of looking up the starting address in a starting module of the executable file.

16. The method of claim 15 wherein the step of looking up the starting address in the starting module comprises looking up the starting address in a header of the starting module.

17. The method of claim 7 wherein the step of starting the target process as suspended comprises the steps of:

setting a flag in a create process command; and executing the create process command.

18. The method of claim 7 wherein the step of inserting code at the starting address of the target process comprises inserting code at a location where the code is executed before target process code is executed when the target process execution is resumed.

19. The method of claim 7 wherein the step of loading the external module comprises loading a dynamic link library.

20. The method of claim 7 wherein the step of loading the external module further comprises looking up a name of the external module in an operating system registry file.

* * * * *

UNITED STATES PATENT AND TRADEMARK OFFICE
CERTIFICATE OF CORRECTION

| | |
|---|---|
| PATENT NO. | : 6,698,016 B1 |
| DATED | : February 24, 2004 |
| INVENTOR(S) | : Ghizzoni |

It is certified that error appears in the above-identified patent and that said Letters Patent is hereby corrected as shown below:

<u>Column 2,</u>
Line 2, "AppInit" should read -- AppInit --.

Signed and Sealed this

Twenty-ninth Day of June, 2004

JON W. DUDAS
*Acting Director of the United States Patent and Trademark Office*